KENNETH M. ALLEN
CHESTER H. HARPER
INVENTORS

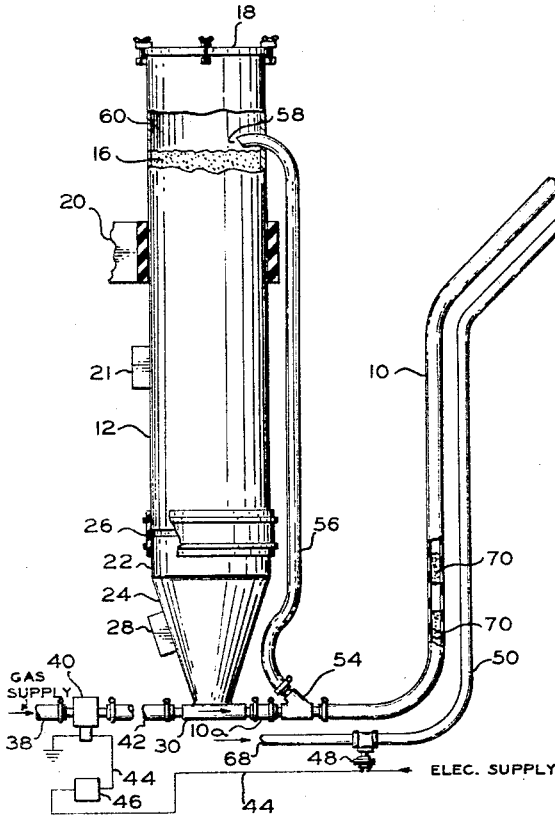
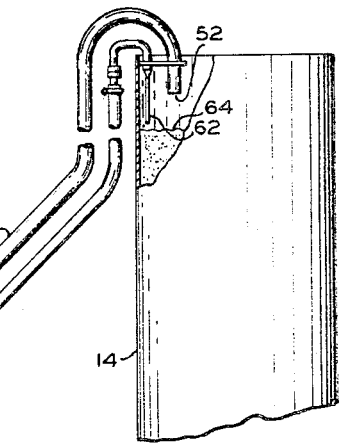
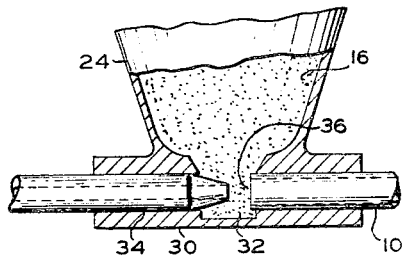
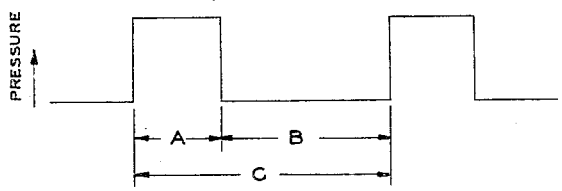
FIG. 1
FIG. 2
FIG. 3
KENNETH M. ALLEN
CHESTER H. HARPER
INVENTORS
BY
BUCKHORN, BLORE, KLARQUIST & SPARKMAN
ATTORNEYS

BY
BUCKHORN, BLORE, KLARQUIST & SPARKMAN
ATTORNEYS

United States Patent Office 3,380,780
Patented Apr. 30, 1968

3,380,780
PNEUMATIC CONVEYING SYSTEMS
Kenneth M. Allen and Chester H. Harper, both of
P.O. Box 352, Newberg, Oreg. 97132
Filed Dec. 23, 1965, Ser. No. 515,818
9 Claims. (Cl. 302—26)

ABSTRACT OF THE DISCLOSURE

Pulses of air through a nozzle at the bottom of a hopper-like receptacle inject successive, spaced slugs of particle material into a conveyor conduit and move the slugs along the conduit to a receiving receptacle. A second conduit connects the upper end of the hopper-like receptacle to the conveyor conduit, relieves back pressure in the hopper-like receptacle and aids in keeping the slugs moving in the conveyor conduit during the intervals between the pulses. In one embodiment the hopper-like receptacle has a conical lower end, the conveyor conduit extends along one side of the conical lower end, and a spiral support member carries the conveyor conduit.

Description

This invention relates to pneumatic conveying systems and particularly to pneumatic conveying methods and systems employing a series of air impulses for conveying particle material.

High pressure pneumatic conveyor systems are useful in efficiently transporting quantities of fairly dense particle material. However, such systems have a disadvantage in that the material conveyed is blown about at the discharge end or discharge receptacle of the conveyor system. The conveyed material is frequently scattered and considerable dust produced which is then removed with an air separator, filter or the like. Moreover, in such a system the conveyed material is likely to be harshly treated and frequently becomes damaged.

It is therefore an object of the present invention to provide a pneumatic conveying system retaining the advantages of a reasonably high pressure pneumatic conveyor but which gently conveys the transported material and discharges the same without excessive dusting or scattering of the conveyed material.

It is another object of the present invention to provide a pneumatic conveyor wherein movement of particle material is effectively and efficiently initiated and continued without excessive harsh handling thereof.

It is a further object of the present invention to provide a means and method of more efficiently conveying reasonably dense particle material.

It is another object of the present invention to provide a method for conveying particle material efficiently and with enhanced gentleness while avoiding undesirable dusting and scattering of the conveyed material.

In accordance with the present invention, particle or powdery material is pneumatically conveyed by means of a series of repetitive impulses of substantially high pressure gas, e.g. high pressure air. During intervals between such impulses, the conveyed material is sustained with lower gas pressure. The high pressure pulsations overcome friction encountered by the conveyed material in order for the material to be caught in a moving stream, but after movement is started, the lower pressure during intervals between pulses is sufficient for sustaining the movement of the material. The average pressure is relatively low and it is therefore found that dusting and scattering of material is substantially reduced and minimized in accordance with the present invention. Moreover, the conveyed material is more gently treated resulting in decreased damage thereof.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings, wherein like reference characters refer to like elements and in which:

FIG. 1 is an elevation, partially broken away, of a conveyor system in accordance with the present invention;

FIG. 2 is a detail drawing, partially in cross-section, of the apex region of a conical hopper employed in the FIG. 1 system;

FIG. 3 is a graph showing air pressure plotted against time in a conveyor conduit employed in accordance with the present invention.

Figure 4:
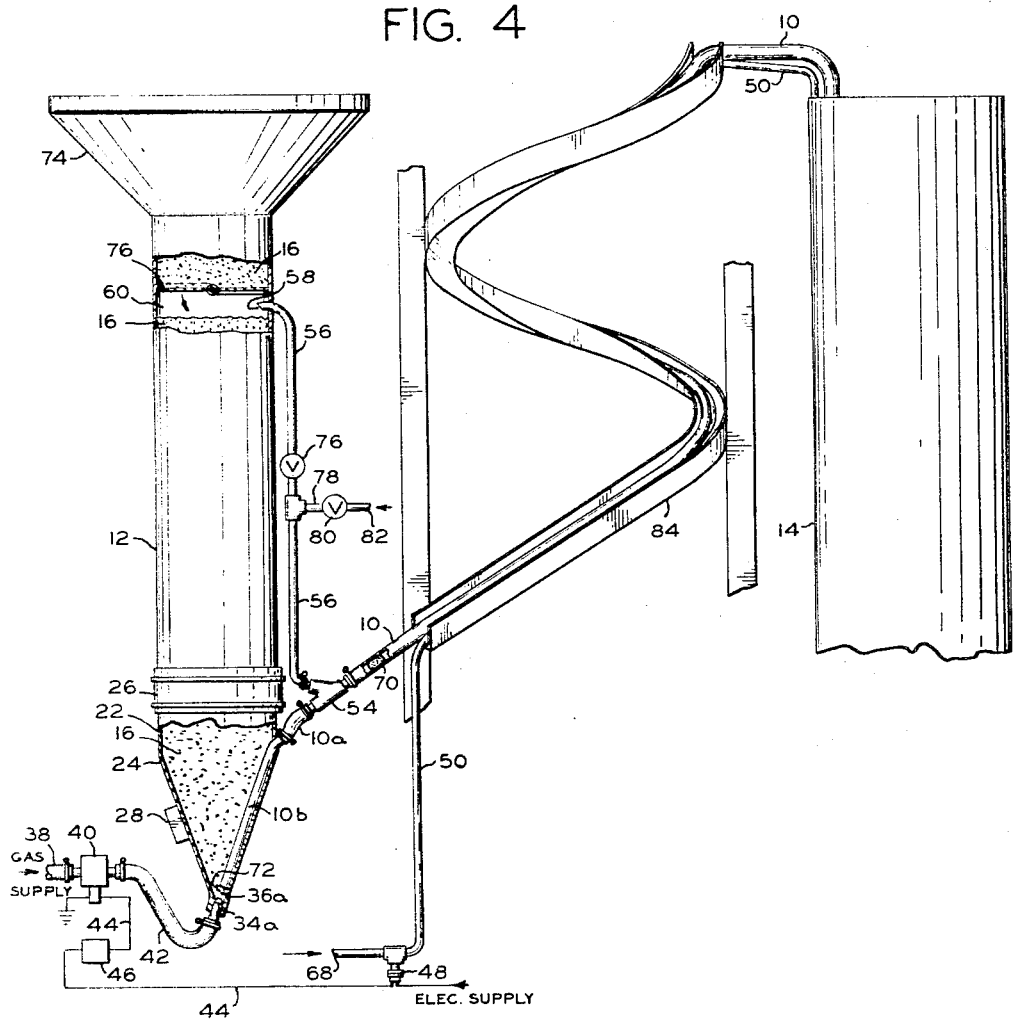
FIG. 4 is an elevation, partially broken away, of a conveyor in accordance with a second embodiment of the present invention.

Referring to FIGS. 1 and 2, illustrating an apparatus according to the present invention, a conveyor system comprises a conduit 10 extending from a first receptacle 12 to a second receptacle 14 elevated in location with respect to the first. The conveyor system transports particle material such as a powder, rice, sugar or the like, as indicated at 16, from receptacle 12 through the conduit 10 and into receptacle 14. The receptacle 12, which may comprise a vertical cylinder having a top closure 18, is flexibly mounted and supported within a rubber mount 20 and has a vibrator 21 secured to the side thereof for causing agitation of the material 16. The lower end of receptacle 12 communicates with a hopper bottom 22 having a lower conical section 24 with walls sloping inwardly toward an apex at the lower end of the hopper bottom. The hopper bottom 22 is joined to receptacle 12 by means of a rubber closure 26 secured tightly around both members 12 and 22 providing a flexible mounting for the latter. A vibrator 28, joined to the hopper bottom 22, is employed for the purpose of agitating the material within the receptacle toward the lower apex so the material may be conveyed therefrom.

Hopper bottom 22 is provided at its lower end with a fitting 30 through which gas under pressure may pass where it forces particle material 16 into conduit 10. As illustrated more clearly in FIG. 2, fitting 30 is located in the region of the apex of conical section 24 and has a depending well 32 positioned approximately at the location of such apex. Gas inlet nozzle 34 is directed into well 32 directly opposite the inlet end 36 of conduit 10 such that nozzle 34 and conduit 10 are aligned and gas under pressure entering nozzle 34 urges material 16 directly toward and into the conduit 10.

Gas for nozzle 34, suitably air at a pressure between 60 and 100 pounds per square inch, enters at inlet 38, and is controlled by an electrically operated valve 40 such that the gas is intermittently supplied through a high pressure line 42 communicating with nozzle 34. High pressure line 42 suitably comprises flexible tubing or hose to allow for vibration of hopper bottom 22. Valve 40 is operated via a connection 44 from a source of electric power by way of timer 46 and pressure switch 48. Pressure switch 48 is operated by buildup of pressure in line 50 as hereinafter more fully described. Timer 46 suitably comprises a motor operated clock timer, an intermittently operated relay, or similar device, having electrical contacts alternately opened and closed. Assuming pressure switch 48 is closed, timer 46 regularly closes its contacts to open (or close) valve 40.

The timed operation of valve 40 is illustrated more fully in the chart of FIG. 3 wherein the time period A illustrates the length of time which valve 40 is opened under the control of timer 46, allowing high pressure gas to reach nozzle 34. Time period B in FIG. 3 represents the interval during which the gas pressure in line 42 is materially reduced, that is reduced to the back pressure in the line with valve 40 substantially turned off. C illustrates the entire period or cycle of operation of high pressure and low pressure conditions in line 42 and this cycle repeats a plurality of times such that a series of pulsations of high pressure gas is delivered through nozzle 34. These pulsations are relatively short and closely spaced. For example, the time period A should be one second or less with the time period B being three seconds or less. A preferred time, A, for each pulsation, is one-quarter second, with an overall period C of two seconds, leaving a low pressure interval B of one and three-quarter seconds between pulsations. This time schedule is found very desirable in conveying particle material efficiently and without excess expulsion of gas toward receptacle 14.

Conduit 10 may comprise rigid or flexible tubing, and is steeply sloping. This tubing had an inside diameter of approximately three-quarter inch in the instance of a specific embodiment. Conduit 10 has an inlet end 36 communicating to the apex region of hopper bottom 22, an outlet end 52 communicating into receptacle 14, and further includes a connection 54 joining conduit 10 to a low pressure line 56, the latter having an open end 58 extending into region 60 above material 16 in receptacle 12. Conduit 10 is otherwise closed. Connection 54 is suitably a Y connection oriented such that low pressure gas from line 56 entering conduit 10 is directed substantially along the direction of flow of gas and material in conduit 10. The line 56 provides a sustaining pressure to conduit 10 and the material therein during the interval B in FIG. 3, that is, between the A higher pressure pulsations. The gas pressure provided with line 56 is on the order of approximately three pounds per square inch and is the pressure accumulated as a back pressure in region 60 above material 16 in receptacle 12. Since the high pressure gas is intermittently supplied at the lower end of the receptacle, that is through nozzle 34 and fitting 30, and since the receptacle 12 is substantially closed, this back pressure builds up in region 60. It is found desirable to add this low pressure to conduit 10 through line 56 for aiding and sustaining the movement of material through the conduit as well as the prevention of backward flow of material therein. Line 56 should enter line 10 relatively close to inlet end 36 thereof, say within six inches to a foot thereof.

Line 50 is employed for discontinuing the flow of material in conduit 10 when receptacle 14 is full. Line 50 extends into the top of receptacle 14 and includes a flat flexible extension 62 depending downwardly from line 50 toward the level of particle material 64 discharged from the outlet end 52 of conduit 10. Low pressure air provided to line 50 at its inlet 68 normally passes out of the end of flat extension 62 into receptacle 14, providing the level of material 64 remains below the end of the extension 62. As the level of material 64 rises, extension 62 is flattened against the side of receptacle 14 building up a pressure within line 50. This pressure operates the switch 48 and disconnects the source of power from timer 46 and valve 40, shutting off the supply of high pressure gas and discontinuing the operation of the conveyor.

The conveyor according to the present invention operates to provide efficient flow of particle material through conduit 10 and into the outlet receptacle 14 without the usual accompanying continuous high pressure air blast and attendant blowing about of conveyed material. Rather, the material is efficiently conveyed with a minimum of gas and minimum of energy, and with a minimum of deposition of the particle material beyond the desired outlet area. Moreover, enhanced gentleness in handling the conveyed material is provided. The periodic pulsations of high pressure gas through nozzle 34 act to inject spaced, successive, substantially sealing concentrations or plugs of material through conduit 10 as illustrated at 70 in FIG. 1. The high pressure gas in the form of intermittent pulsation overcomes friction between the particle material and surrounding particle material or the friction between particle material and the surrounding conduit and these pulsations move the material intermittently along the conduit 10 since the pressure of the pulsations is sufficient to overcome friction and force movement. However, in the interval between pulsations, movement of the material is sustained within the conduit by means of low pressure accumulated within the conveying system, either within the conduit, or within the inlet receptacle and reaching the conduit via the inlet end thereof or through low pressure line 56 joined to conduit 10. Although material is thus efficiently moved along the conduit, the conveyor outlet is effective at a lower pressure because the average pressure in the system is relatively low. Therefore, material is delivered with enhanced smoothness and gentleness into outlet receptacle 14, without the usual blowing and scattering of material, and without the harsh treatment thereof usually accompanying a conventional high pressure system.

The embodiment of FIG. 4 is similar to the embodiment already described as regards like elements referred to with like reference numerals and its operation is also substantially similar. Conduit 10 again transfers particle material from receptacle 12 to receptacle 14 located at a higher level. High pressure gas, for example, air, at an approximate pressure between 60 and 100 pounds per square inch is supplied to line 42 through valve 40 controlled in its operation by means of timer 46 such that the valve 40 is alternately opened and closed. The resulting high pressure pulsations pass through nozzle 34*a* directed toward section 10*b* of conduit 10 in aligned relation therewith, urging particle material 16 into the conduit.

In this embodiment, section 10*b* of conduit 10 is disposed along the inner surface of conical section 24 of hopper bottom 22, along a line extending substantially from apex area 72 toward the outer perimeter of the conical section, with the conduit section thus slanting upward along the inside wall of the hopper. The nozzle 34*a* is positioned substantially at the location in the apex area 72 and is directed toward inlet end 36*a* of conduit 10 in spaced relation thereto. Thus, pulsations of gas from line 42 urge particle material 16 upwardly into conduit section 10*b*. The angular disposition of the nozzle and the conduit, with the nozzle approximately at the apex of the hopper bottom, has been found advantageous in improving the concentration of material occurring in the conduit with each impulse of gas pressure. This is due in part to increased agitation of material 16 in the hopper bottom just above the apex area 72 caused by the upwardly directed impulses from nozzle 34*a*. Material is found to more rapidly drop into the area between the nozzle and the conduit as other material is conveyed away.

The receptacle 12 in the embodiment illustrated in FIG. 4 is provided with a funnel top 74 and a butterfly valve 76 therebelow within receptacle 12. Butterfly valve 76 closes off the top of receptacle 12 and allows build-up of residual pressure in region 60 above material 16 as described in connection with the previous embodiment. This residual pressure may be applied through low pressure line 56 to conduit 10 providing a low sustaining pressure, on the order of three pounds per square inch, during the interval between higher pressure impulses from nozzle 34*a*. In this embodiment, a valve 76 is placed in line 56, and an additional line 78 is joined in line 56 below the valve 76. Line 78 is suitably joined to a source of low pressure gas through a valve 80 for the purpose of providing an alternative source of sustaining pressure to the conduit 10 between high pressure impulses. When such additional low pressure is provided at 82 and through valve 80, valve 76 is closed.

Also in the FIG. 4 embodiment, the conduit 10 is supported within a helical trough 84 extending approximately from the level of hopper bottom 22 of receptacle 12 to the upper end of receptacle 14. The turns of the helix desirably make an angle of approximately thirty degrees with the horizontal. The gradual slope of the conduit 10 between its inlet end and outlet end permits better concentration of material, as indicated at 70, within the conduit. This gradual slant of the conduit minimizes vertical drop of material within the conduit and also minimizes the flattening of material as may occur in an extended horizontal run of conduit. Escape of air past concentrations of material is thereby minimized. Of course, the conduit may take a slanted but straight path between receptacles 12 and 14, but the helical path advantageously provides substantial raising of the material in a limited horizontal space.

As before, a low pressure line 50 is employed to shut off the power to valve 40 through the operation of pressure switch 48 when receptacle 14 is substantially filled. For convenience, line 50 is also disposed in the helical path provided by trough 84. It should be noted that the various modifications of the FIG. 1 conveying system as illustrated in FIG. 4 may also be applied individually or in various combinations to the FIG. 1 embodiment. These various embodiments accomplish the method according to the present invention involving conveying particle material with pulsating gas.

While we have shown and described several embodiments of our invention, it will be apparent to those skilled in the art that many other changes and modifications may be made without departing from our invention in its broader aspects. We therefore intend the appended claims to cover all such changes and modifications as follows within the true spirit and scope of our invention.

What is claimed is:
1. A conveyor for particle material comprising:
   closed conduit means providing a path along which said material is to be conveyed,
   said conduit means having an inlet and an outlet end,
   means for initially containing said particle material and for introducing said particle material into the inlet end of said conduit means,
   means supplying a source of gas under pressure to said conduit means having means to successively reduce the pressure of said gas so as to provide a series of pulsations of gaseous pressure interspersed with periods of substantially lower pressure,
   said pulsations causing movement of successive concentrations of said material along said conduit means,
   the friction between said conduit means and said material being overcome by the pulsations of gas pressure so that said material is moved with a minimized over-all quantity of gas while the scattering of material at the outlet end of said conduit is also minimized,
   and an additional source of lower pressure connected to said conduit means to provide periods of lower gaseous pressure during intervals when said gaseous pressure from said means supplying a source of gaseous pressure is substantially reduced.

2. The conveyor according to claim 1 wherein said means for containing said material comprises a substantially closed receptacle having an air space above said material in said receptacle providing the source of lower gaseous pressure, and
   further including an air line connecting the space above said material in said receptacle to said conduit means.

3. In a conveyor,
   supply means containing a mass of particulate material,
   conveyor conduit means having an inlet end opening into a mass of said material,
   a nozzle having an outlet end axially aligned with, directed toward and spaced from the inlet end of said conduit means,
   and means for emitting pulses of gas under pressure from the outlet end of said nozzle against a mass of said material filling the space between said nozzle and said inlet end to periodically flow a solid, plug-like slug of material from said space and a length of gas into said conduit means,
   said supply means serving to refill the space between said nozzle and said inlet end with an additional mass of said material upon the blowing of said slugs therefrom into said conduit means, 4. The conveyor of claim 3 wherein the receptacle is closed and including bleeder conduit means connecting the convyor means and the upper portion of the receptacle.

5. The conveyor according to claim 3 wherein said conduit means is sloped at an angle between vertical and horizontal orientation to provide conveyance of said material to a different level while minimizing drop of material vertically within a length of said conduit means and also minimizing flattening of said material horizontally along said conduit means to prevent escape of gas past said material in said conduit means.

6. The conveyor according to claim 3 wherein said conduit means extends from a first level to an outlet end of said conduit means at a second and higher level and wherein at least a substantial portion of said conduit means forms a helix between said levels.

7. The conveyor according to claim 3 wherein said supply means having a hopper bottom having an apex toward which said material descends by gravity feed, and
   said nozzle extending into the region of said apex on one side of said apex,
   the inlet end of said conduit means extending into the region of said apex in aligned relation opposite said nozzle so that gas pressure pulsations from said nozzle direct material into the inlet end of said conduit means.

8. The conveyor according to claim 7 wherein said hopper bottom includes a side wall slanting upwardly from said apex with the inlet opening of said conduit means being disposed slantwise along said wall and being directed toward said apex, and
   wherein said nozzle is located in the immediate area of said apex in spaced relation from the inlet end of said conduit means being directed angularly toward the inlet end of said conduit means for directing said material into said conduit means.

9. The conveyor according to claim 7 further including a flexible mount for said hopper bottom and vibrator means for causing motion of said hopper bottom.

References Cited

UNITED STATES PATENTS

| | | | |
|---|---|---|---|
| 1,503,365 | 7/1924 | Hoyt | 302—24 |
| 2,120,003 | 6/1938 | Schanz | 302—26 |
| 2,779,510 | 1/1957 | Wilson | 222—196 |
| 2,794,686 | 6/1957 | Anselman | 302—24 |
| 2,872,338 | 2/1959 | Landrigan | 222—193 |
| 2,905,362 | 10/1959 | Aust | 222—56 |
| 3,095,097 | 6/1963 | Mellow | 222—56 |

EDWARD A. SROKA, *Primary Examiner.*

EVON C. BLUNK, *Examiner.*

H. C. HORNSBY, *Assistant Examiner.*